United States Patent [19]

Ford

[11] Patent Number: 4,475,793
[45] Date of Patent: Oct. 9, 1984

[54] INTEGRATED OPTICAL BEAM EXPANDER
[75] Inventor: Eric H. Ford, Richardson, Tex.
[73] Assignee: Texas Instruments Incorporated, Dallas, Tex.
[21] Appl. No.: 383,409
[22] Filed: Jun. 1, 1982
[51] Int. Cl.³ .............................................. G02B 27/14
[52] U.S. Cl. .................................. 350/172; 350/301; 350/171
[58] Field of Search ............... 350/172, 294, 301, 171, 350/453, 501, 503, 520, 442; 89/41 L

[56] References Cited
U.S. PATENT DOCUMENTS

| | | | |
|---|---|---|---|
| 3,541,323 | 11/1970 | Stewart et al. | 350/442 |
| 3,674,334 | 7/1972 | Offner | 350/294 |
| 4,108,551 | 8/1978 | Weber | 350/301 |

Primary Examiner—John K. Corbin
Assistant Examiner—P. M. Dzierzynski
Attorney, Agent, or Firm—Alva H. Bandy; N. Rhys Merrett; Melvin Sharp

[57] ABSTRACT

A reflective afocal beam expander optical system is disclosed for transmitting electromagnetic (EM) energy. The beam expander, in the preferred embodiment, is comprised of a reflective afocal system including a section of a primary parabolic mirror, a section of a secondary parabolic mirror, and a beam splitter. The two mirrors have a common axis of rotational symmetry and a common focus point and the centerline of the incoming EM energy is displaced from the axis of rotational symmetry. The beam splitter is positioned with respect to the primary mirror to receive the edge rays of the EM energy and cause the EM energy to be folded and exit through a window while clearing all optical elements. A viewing system having a viewing axis through the beamsplitter allows a viewer to see through the same window as the exiting EM energy. A second refractive afocal optical system is made integral to the specific laser system being used in order to control beam expansion ratios.

4 Claims, 6 Drawing Figures

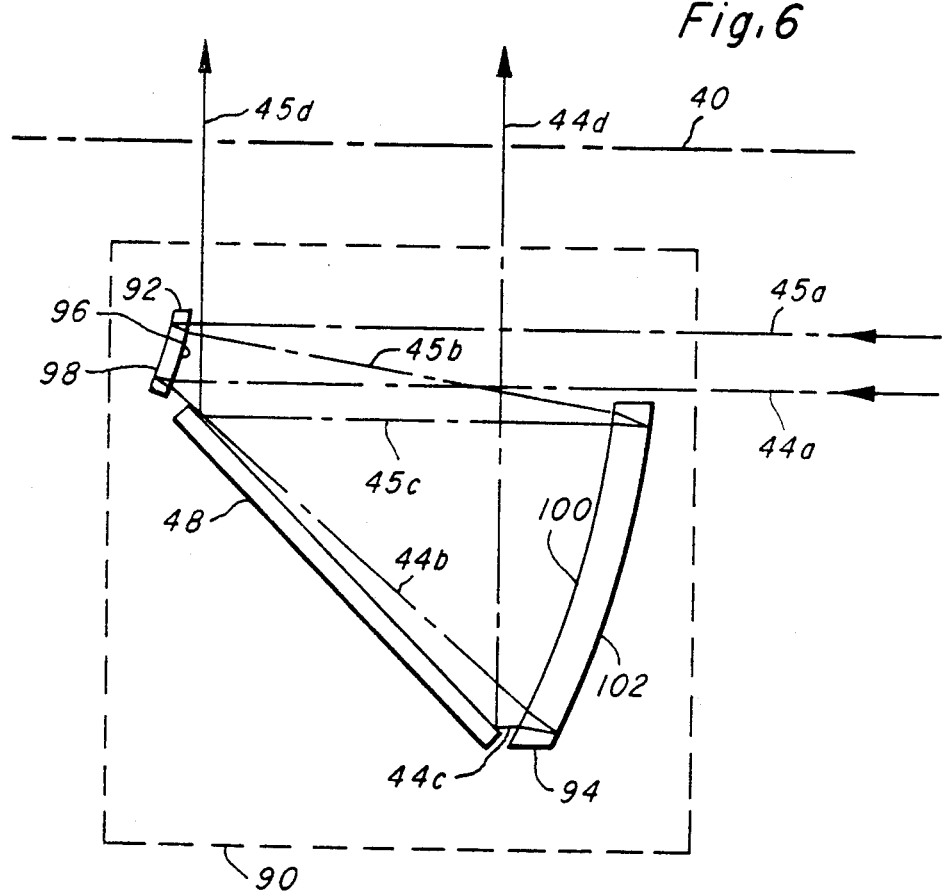

INTEGRATED OPTICAL BEAM EXPANDER

This invention relates to optical systems and more particularly to a reflective afocal optical system.

A single element off-axis paraboloid is known in the art. For example, Smith, W. J. *Modern Optical Engineering*, McGraw Hill, 1966, page 388, describes and illustrates a Herschel mount for a paraboloid which uses an off-axis aperture to keep the focus out of the entering beam. Such off-axis paraboloids are used, for example, in optical testing equipment.

However, other applications require optical systems which will expand or magnify a beam of electromagnetic (EM) energy from a first beam size to a second beam size in a minimum volume with no vignetting and with the capability of combining the incoming EM energy with a separate viewing system.

Accordingly, it is an object of the present invention to provide an optical system which operates off of its axis of rotation to eliminate vignetting the incoming-/outgoing rays.

Another object of the present invention is to provide two off-axis afocal optical systems for beam expansion.

Another object of the present invention is to provide an optical system comprised of two confocal parabolic reflectors which essentially eliminates chromatic aberrations, as well as all other monochromatic aberrations for a given field point.

Another object of the present invention is to provide an optical system comprised of a first refractive afocal telescope and a second reflective afocal telescope which operate non-coaxially.

Another object of the present invention is to provide an optical system which allows integration of a viewing system with a laser system.

Another object of the present invention is to provide essentially coaxial operation of a laser beam expander and visible or infrared viewing system so that boresighting may be readily achieved.

Another object of the present invention is to provide an optical system which integrates a laser beam with a visible or IR viewing system while providing proper magnification and beam correction for laser beam collimation.

Another object of the present invention is to provide an optical system which can be folded to allow an extremely compact configuration.

Another object of the present invention is to provide an optical system which is easy to fabricate and relatively inexpensive.

Other objects and features of the invention will become more readily understood from the following detailed description and appended claims when read in conjunction with the accompanying drawings, in which like reference numerals designate like parts throughout the figures thereof, and in which:

FIG. 6 illustrates an alternate embodiment of the reflective afocal optical system illustrated in FIG. 4.

Figure 1:
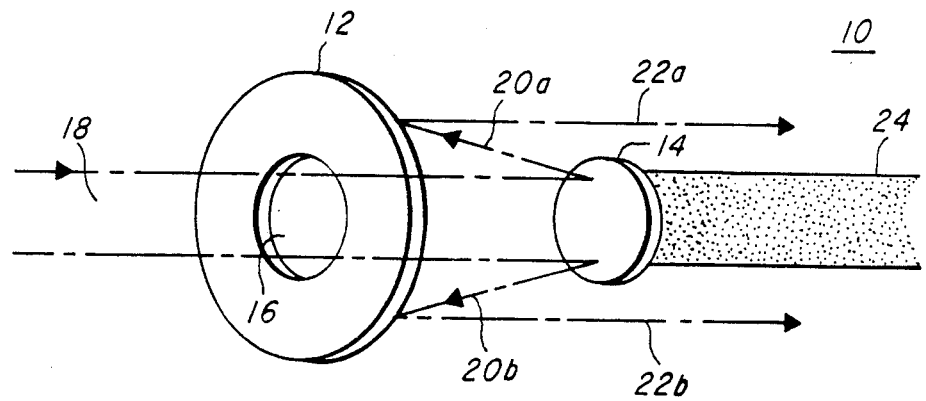
FIG. 1 illustrates a prior art reflective optical system exhibiting vignetting.

FIG. 1 illustrates a prior art reflective optical system 10 which is comprised of two reflective elements 12 and 14. Reflective element 12 has an aperture 16 therein which allows a band of electromagnetic energy 18 to pass through aperture 16 and be reflected from the front surface of optical element 14 as shown by edge rays 20a and 20b. Edge rays 20a and 20b are reflected from the back surface of optical element 12 and re-transmitted as parallel edge rays 22a and 22b. Because of the placement of reflective element 14, a large percentage of the incoming electromagnetic radiation 18 is blocked and is not included within the edge rays 22a and 22b. This area in which blocking occurs is shown as shaded area 24. This property of blocking of radiation due to placement of optical elements is referred to as vignetting.

In many optical applications, vignetting is not only undesirable but is completely unacceptable, especially when the incoming electromagnetic radiation 18 is from a laser light source. Because of the gaussian distribution of the laser energy, the vignetting caused by the blockage shown by shaded area 24 results in a decided loss of laser beam integrity.

Figure 2:
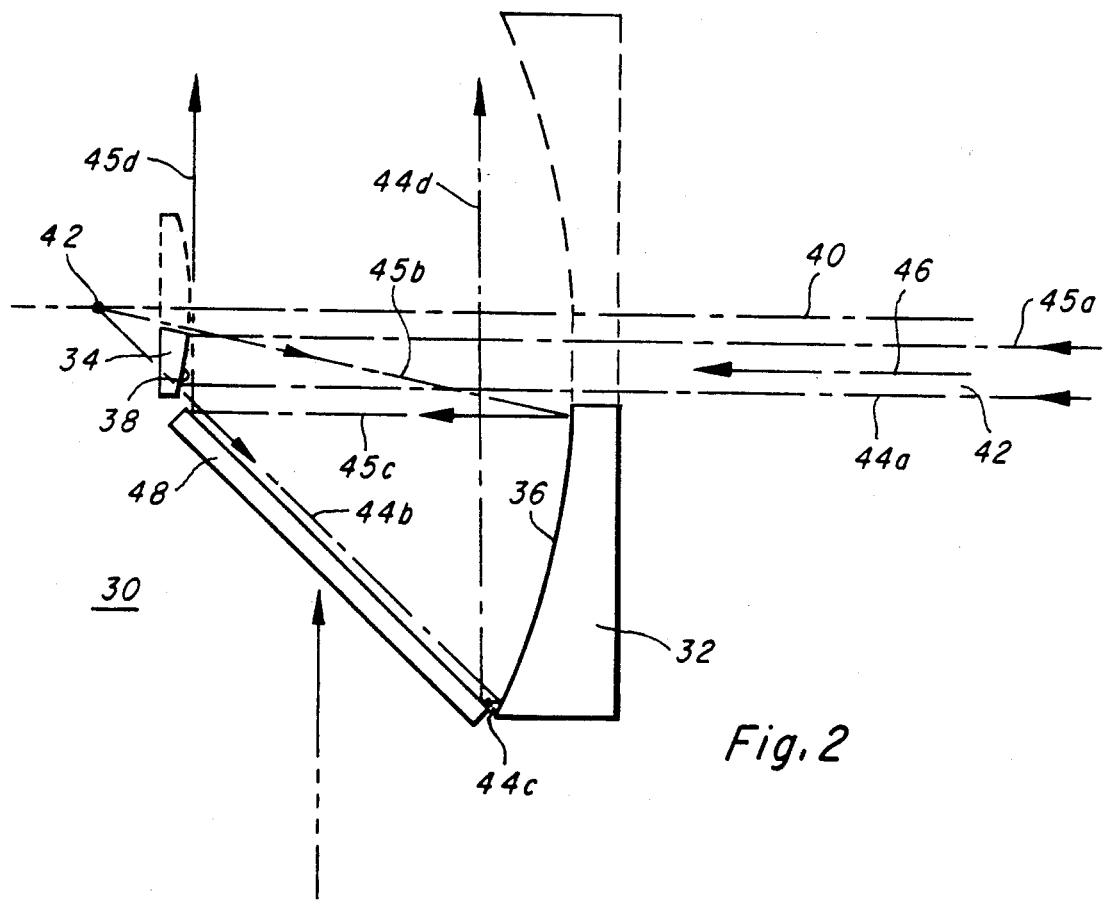
FIG. 2 illustrates the off-axis reflective afocal optical system according to the present invention.
Figure 3:
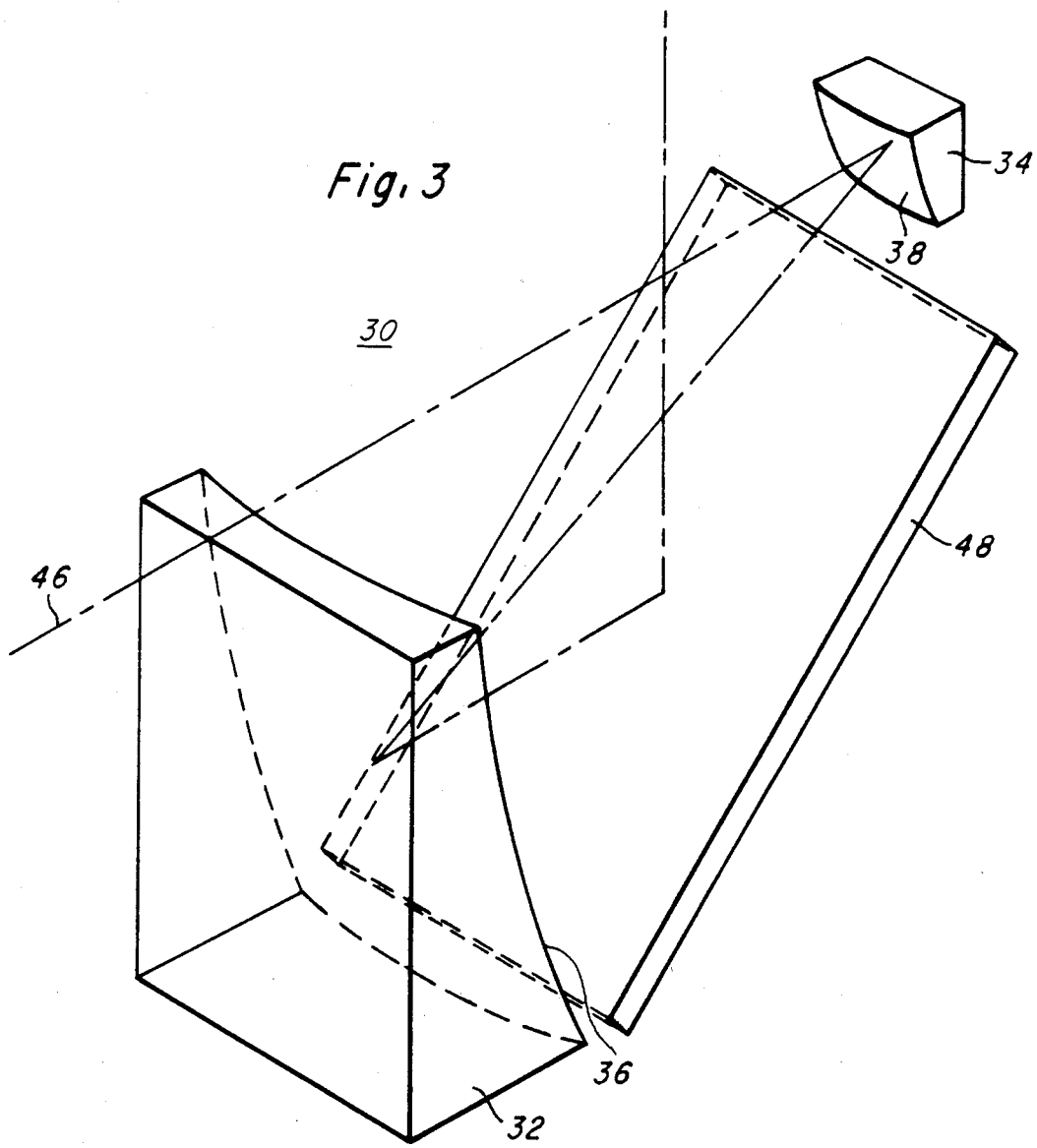
FIG. 3 is a perspective view of the afocal optical system shown in FIG. 2.

Referring now to FIGS. 2 and 3, there is illustrated a reflective afocal optical system or beam expander 30 which is comprised of a section of an aspheric primary mirror 32 and a section of an aspheric secondary mirror 34. Only sections of primary mirror 32 and secondary mirror 34 are utilized in the present invention although for purposes of illustration, the remaining portions of these two mirrors are shown in dotted form in FIG. 2. Although the reflecting surfaces 36 of mirror 32 and the reflecting surface 38 of mirror 34 can be general aspheres or other conic sections (such as ellipsoids and hyperboloids), in the preferred embodiment, these two surfaces will be paraboloids. Mirrors 32 and 34 may be fabricated from alluminum and manufactured using diamond turning optical fabrication techniques. Mirrors 32 and 34 have a common axis of rotational symmetry 40; also mirrors 32 and 34 have a common focus point 42 (although for mirror 34, focal point 42 is the virtual focal point). Incoming electromagnetic energy 42 is comprised of edge rays 44a and 45a. It will be noted that the centerline 46 of the electromagnetic energy 42 is displaced from the axis of rotational symmetry 40 a predetermined distance which allows the elimination of vignetting.

Figure 4:
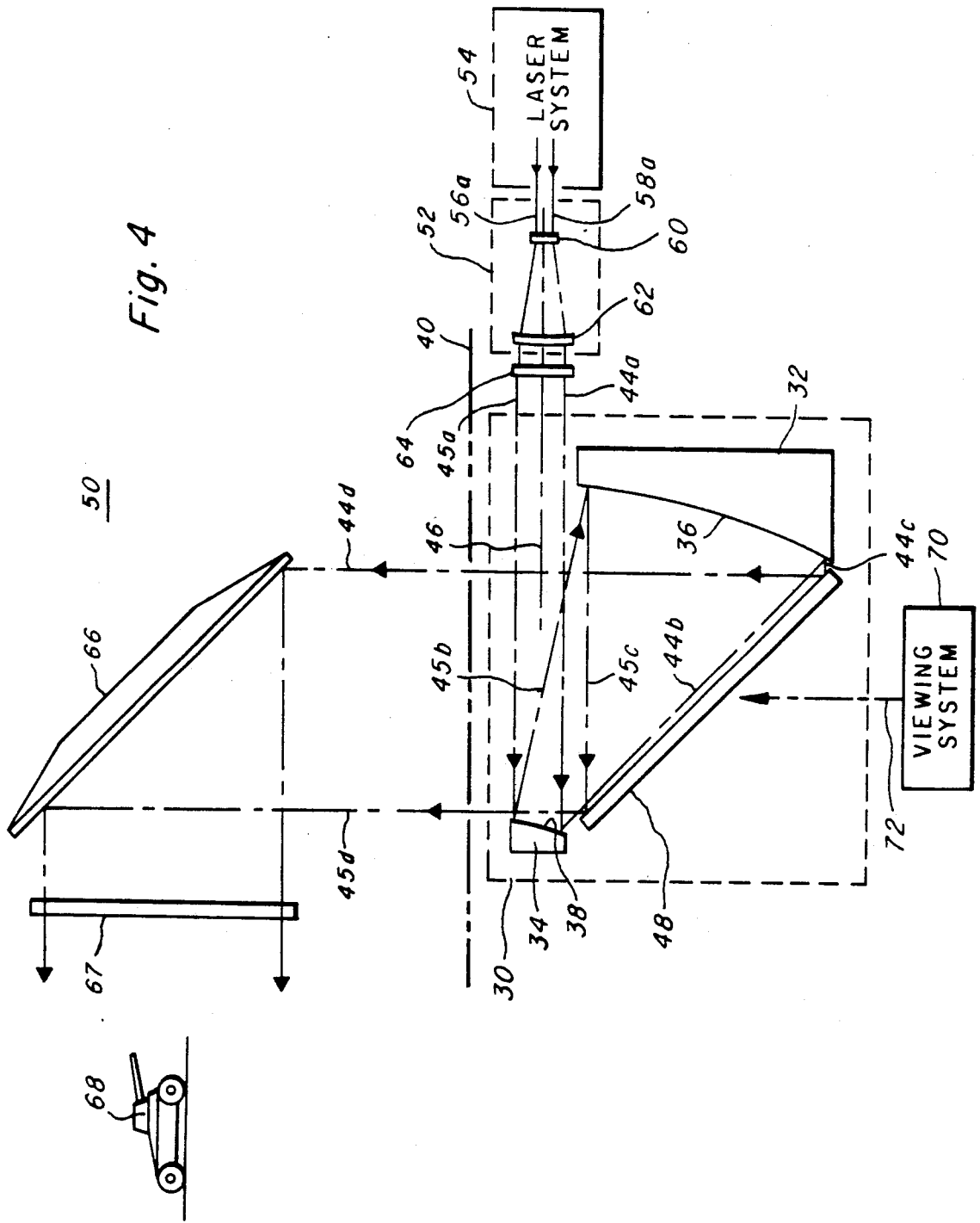
FIG. 4 illustrates an integrated beam expander including both a reflective and refractive afocal optical system.

In one embodiment of the system 30, the incoming electromagnetic energy 42 may be from a laser system (shown in FIG. 4). The edge rays 44a and 45a are reflected from reflective surface 38 to form edge rays 44b and 45b which are in turn reflected off of reflective surface 36 to form edge rays 44c and 45c. A beamsplitter, such as dichroic beamsplitter 48, is optically positioned to receive the edge rays 44c and 45c from primary mirror 32. For minimizing the volume utilized by optical system 30, it is desired to have edge ray 44b reflected from secondary mirror 34 at an angle of 45°. Beamsplitter 48 also will be at an angle of 45° with respect to a vertical axis.

Edge rays 44c and 45c are reflected from reflective surface 36 to impinge upon beam splitter 48. Beam splitter 48 folds the electromagnetic energy 42 to thereby produce edge rays 44d and 45d exiting from the optical system 30. The magnification of optical system 30 is the ratio of the exiting beamwidth defined by edge rays 44d and 45d to the incoming beamwidth defined by edge rays 44a and 45a.

FIG. 4 illustrates an integrated beam expander system 50 which utilizes the reflective afocal optical system 30 illustrated in FIGS. 2 and 3. The integrated beam expander system 50 may be used in numerous applications, for example, in a vehicle or tank environment. If additional magnification is required, a refractive afocal optical system 52 may be used in combination with reflective afocal optical system 30 to obtain the desired beam expansion of the laser beam produced by laser system 54. Laser system 54 may be a laser rangefinder, a laser designator or laser receiver. In the preferred embodiment, refractive afocal optical system 52 is an integral part of laser system 54. Laser system 54 produces a laser beam having edge rays 56a and 58a which is magnified or expanded through refractive afocal optical system 52 to a beamwidth defined by edge rays 44a and 45a. Refractive afocal optical system 52, in its simplest version, is comprised of two single element lenses 60 and 62. Lens 60 is a negative diverging lens while lens 62 is a positive converging lens. A window, for example, made of ZnSe is used as an interface between the refractive and the reflective afocal optical systems 52 and 30. If laser system 54 is a Nd:Yag laser operating at a wavelength of 1.06 $\mu$m, then lenses 60 and 62 are made of quartz or similar transmissive material. If laser system 54 is a $CO_2$ laser, then lens elements 60 and 62 may be made of ZnSe or similar transmissive material. The reflective afocal optical system 30 and the refractive afocal optical system 52 are independently corrected and therefore it is a simple matter to change the spectral operation band of the system by replacing the refractive afocal optical system 52 for the particular laser wavelength required; therefore, the reflective afocal optical means 30 may remain unchanged. If the refractive afocal optical system 52 has a magnification of 1.6 and the reflective afocal optical system has a magnification of 5, then the resulting magnification of the two systems in series is 8 (1.6×5) for the laser beam expander system 50.

The exiting edge rays 44d and 45d from the reflective afocal optical system 30 are reflected from a tilted head mirror 66 which reflects the laser beam through the front window 67 to thereby illuminate a target 68.

A viewing system 70 having a viewing axis 72 allows an observer to view the target along the viewing axis 72 which is parallel to the axis of the beam 44d and 45d. In other words, an observer may view the target and the laser system will illuminate the same target through a common window simultaneously.

Figure 5:
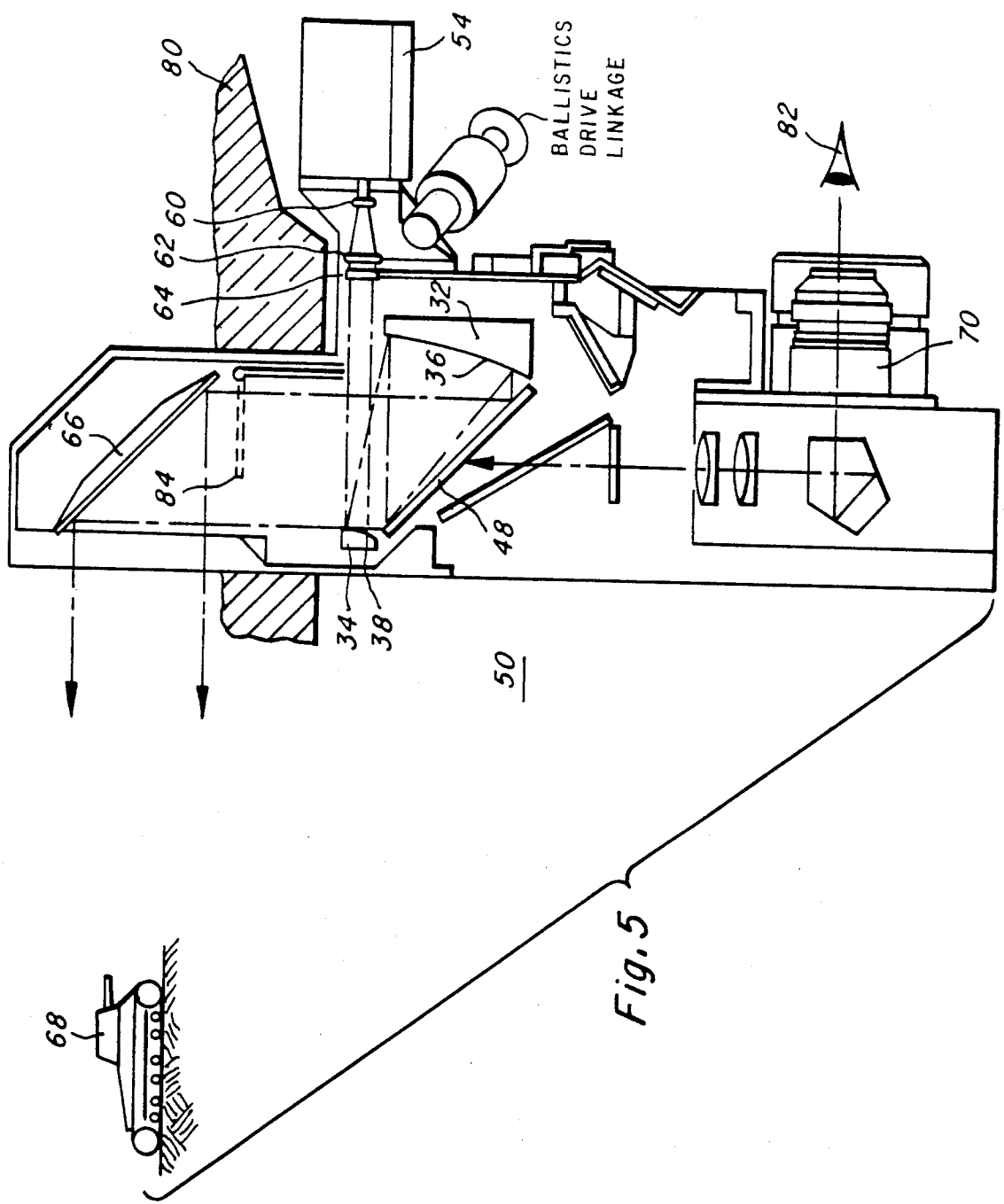
FIG. 5 illustrates the system of FIG. 4 incorporated into a vehicle or tank environment.

FIG. 5 illustrates a side view of the integrated laser beam expander system 50 positioned in a tank turret 80 or other vehicle with the outline of the tank turret shown in a shaded cross-section. As shown in this environment, an observer 82 may look through the viewing system 70, which may either be a visible or IR viewing system, by way of example, in which the observer 82 may rotate tank turret 80 to sense the target 68. Since the laser system 54 shares a common window with the viewing system 70 and are boresighted together, when the observer 82 has the target 68 boresighted, the laser rangefinder can accurately determine range to the target 68. The advantage of having the exiting laser beam 44d and 45d in FIG. 4 essentially coaxial with the viewing axis 72 of the viewing system 70 is that it allows ease of boresighting the two together through the use of boresight retrocubes 84 (FIG. 5) when rotated into the dotted line position.

FIG. 6 illustrates an alternative afocal optical system 90 which can be used in lieu of afocal optical system 30 illustrated in FIG. 4. Afocal optical system 90 is comprised of two Mangin mirrors, 92 and 94. Secondary mirror 92 has a front surface 96 and a rear surface 98 while primary mirror 94 has a front surface 100 and a rear surface 102.

The Mangin mirrors 92 and 94 are sections of Mangin mirrors and have a common axis of rotation 40 and a common focus point (not shown). Mangin mirrors 92 and 94 are optically positioned in essentially the same manner as the primary and secondary mirrors 32 and 34 in FIG. 4.

The main difference is that edge rays 44a and 45a are refracted through secondary Mangin mirror 92, reflected off of back surface 98 and refracted back through mirror 92. In a similar manner, edge rays 44b and 45b are refracted through primary Mangin mirror 94, reflected off of back surface 102 and refracted back through mirror 94.

Operationally, the optical system 90 of FIG. 6 and optical system 30 of FIG. 4 function in the same manner. When a $CO_2$ laser (10.6 $\mu$m) is used, Mangin mirrors 92 and 94 may be made of germanium or ZnSe, for example; if a Nd:Yag laser (1.06 $\mu$m) is used, Mangin mirrors 92 and 94 may be made of a visible optical glass or quartz, for example.

Various designs can be accomplished to obtain different system magnifications from 8× (1.6× in the refractive afocal) to 16× (3.2× in the refractive afocal) using a common reflecting afocal optical system. In addition, multispectral operation can be achieved since Nd:Yag lasers (1.06 $\mu$m) and $CO_2$ lasers (10.6 $\mu$m) can be accommodated with a common design. The spectral operation of the system may be changed by either refocusing or replacing the refractive afocal optical system, if a different magnification is required. This can be readily accomplished since the reflective and refractive afocal optical systems are independently corrected.

The beam expander described above allows a reflective afocal optical system to be used which does not vignette the beam at the secondary mirror because of the reflective and refractive optical systems being non-coaxial. The refractive afocal, instead of being centered on the axis of rotation of the parabolic mirrors, is decentered sufficiently to produce an output beam from the primary mirror which completely clears the secondary mirror. This allows a zero vignetting condition and further allows a beamsplitter to be positioned such that the output beam can be folded back through the reflective afocal and a viewing system can look through the beamsplitter, producing coaxial laser and viewing system lines of sight which can share a common window.

Additionally, all of the aberration coefficients are nominally zero. The electromagnetic energy or laser beam will not be measurably degraded by the performance of the beam expander optics described herein. Accordingly, in a production system, all of the error budget allocated to the optic portion of the system can be used in fabrication and assembly tolerances, resulting in a relatively low cost, high yield design.

Although the present invention has been shown and illustrated in terms of a specific apparatus, it will be apparent that changes or modifications can be made without departing from the spirit and scope of the invention as defined by the appended claims.

I claim:
1. A beam expander comprising:
(a) an electromagnetic energy generating means for generating an electromagnetic energy beam at a preselected wavelength said beam having first and second edge rays; and
(b) an optical path for receiving the electromagnetic energy from the electromagnetic energy generating means and conducting the energy without obscuration to an exiting optical path common to a plurality of optical systems, said optical path including a reflecting system consisting of:
 (i) a secondary reflecting mirror for reflecting the electromagnetic energy including the first and second edge rays, said secondary reflecting mirror having a preselected position and curvature with respect to the incident electromagnetic energy for reflecting the first edge ray at substantially a 45 degree angle with respect to the incident energy,
 (ii) a primary reflecting mirror for receiving and reflecting the energy including the first and second edge rays from the first reflecting mirror, said primary reflecting mirror having a preselected position and curvature; and
 (iii) a beamsplitter positioned substantially parallel and adjacent to the first edge ray reflected from the secondary mirror for receiving and redirecting the electromagnetic energy including the first and second edge rays along the common exiting optical path without obscuration.

2. A beam expander according to claim 1 wherein the primary and secondary reflecting mirrors have a preselected magnifying power.

3. An integrated beam expander according to claim 1 wherein the electromagnetic energy generating means includes a Nd:Yag laser operating at a wavelength of about 1.06 microns.

4. An integrated beam expander according to claim 1 wherein the electromagnetic energy generating means includes a $CO_2$ laser.

* * * * *